US005434563A

United States Patent [19]

Kudoh

[11] Patent Number: 5,434,563

[45] Date of Patent: Jul. 18, 1995

[54] PAGING RECEIVER IN WHICH AN ANNOUNCING UNIT IS AUTOMATICALLY CONTROLLED AT A PARTICULAR TIME INSTANT

[75] Inventor: Kazuhiro Kudoh, Tokyo, Japan

[73] Assignee: NEC Corporation, Tokyo, Japan

[21] Appl. No.: 142,106

[22] Filed: Oct. 28, 1993

Related U.S. Application Data

[63] Continuation of Ser. No. 693,126, Apr. 29, 1991, abandoned.

[30] Foreign Application Priority Data

Apr. 27, 1990 [JP] Japan .................................. 2-112993
May 31, 1990 [JP] Japan .................................. 2-56483 U

[51] Int. Cl.⁶ .......................... H04Q 7/00; G08B 3/10

[52] U.S. Cl. .......................... 340/825.44; 340/825.37; 340/309.15; 340/309.5; 455/38.2; 455/231

[58] Field of Search ...................... 340/825.44, 825.45, 340/825.46, 825.47, 825.48, 539, 311.1, 309.15, 309.2, 309.3, 309.4, 309.5, 825.037; 455/38.2, 38.4, 231

[56] References Cited

U.S. PATENT DOCUMENTS 4,701,759 10/1989 Nadir et al. .................... 340/825.48
4,803,487 2/1989 Willard et al. ................. 340/825.44
4,855,731 8/1989 Yoshizawa et al. ............ 340/825.44
4,860,005 8/1989 DeLuca et al. ................ 340/825.47
4,870,403 9/1989 Mori et al. ...................... 340/825.44
4,872,005 10/1989 DeLuca et al. ................ 340/825.44
4,962,367 10/1990 Tymn ................................. 340/539
5,012,219 4/1991 Henry ............................ 340/825.44
5,077,829 12/1991 Tsunoda et al. ............... 340/825.44
5,264,841 11/1993 Wagai et al. ................... 340/825.44

FOREIGN PATENT DOCUMENTS

WO8805184 7/1988 WIPO .
WO/9010359 9/1990 WIPO ........................... 340/825.44

*Primary Examiner*—John K. Peng
*Assistant Examiner*—Andrew Hill
*Attorney, Agent, or Firm*—Sughrue, Mion, Zinn, Macpeak & Seas

[57] ABSTRACT

In a paging receiver having a plurality of receiver modes, an announcing arrangement is controlled at a particular time instant determined at a specific time instant which is previous to the particular time instant. The paging receiver is provided with a switch which is switchable to a plurality of conditions of selecting the receiver modes one at a time. A control part inspects the switch to produce a condition signal representative of one of the conditions to which the switch is switched. Responsive to the condition signal, the control part controls the announcing arrangement at the particular time instant.

3 Claims, 4 Drawing Sheets

PAGING RECEIVER IN WHICH AN ANNOUNCING UNIT IS AUTOMATICALLY CONTROLLED AT A PARTICULAR TIME INSTANT

This is a Continuation of application No. 07/693,126, filed Apr. 29, 1991, now abandoned.

BACKGROUND OF THE INVENTION

This invention relates to a paging receiver operable in a paging system.

A conventional paging receiver includes a receiving circuit, an announcing unit, and a power switch having on and off states. The receiving circuit is for receiving a radio signal specifically directed to the receiver.

When the power switch is in the on state, the receiving circuit can receive the radio signal. When the power switch is switched to the off state, the receiving circuit can not receive the radio signal. In this manner, the paging receiver has a plurality of receiver modes which can be selected by the power switch.

The announcing unit comprises a loudspeaker and a display unit. When the radio signal is received by the receiving circuit, the loudspeaker generates a call tone which is for calling a user or an operator. Simultaneously, the display unit provides visual display of messages.

If the user forgets to put the power switch in the on state, the receiving circuit can not receive the radio signal. Therefore, it is impossible to call the user of the paging receiver. Under the circumstances, it is desirable to inform the user of the state of the power switch by the announcing unit when the power switch is kept in the off state for a relatively long time interval.

Recently, it has been known to provide the announcing unit with a plurality of announcement modes. In one of the announcement modes, the loudspeaker is prevented from generating the call tone. In this event, it is desirable that the announcing unit is automatically controlled to have another announcement mode in which the loudspeaker generates the call tone when the radio signal is received by the receiving circuit.

SUMMARY OF THE INVENTION

It is therefore an object of this invention to provide a paging receiver in which an announcing unit is automatically controlled at a particular time instant which is preliminarily determined at a specific time instant which is previous to the particular time instant.

It is another object of this invention to provide a paging receiver which is of the type described and in which the announcing unit generates an audible tone at the particular time instant even when a power switch is kept in an off state.

It is still another object of this invention to provide a paging receiver which is of the type described and in which the announcing unit is controlled at the particular instant to have an announcement mode for making the loudspeaker generate the call tone when the radio signal is received by the receiving circuit.

Other objects of this invention will become clear as the description proceeds.

According to this invention, there is provided a paging receiver which has a plurality of receiver modes and comprises announcing means for carrying out announcement, a switch switchable to a plurality of positions for selecting the receiver modes one at a time, instant determining means for determining a particular time instant at a specific time instant which is previous to the particular time instant, inspecting means connected to the switch for inspecting the switch to produce a condition signal representative of one of the positions to which the switch is switched, and control means connected to the inspecting, the determining, and the announcing means for controlling the announcing means in compliance with the condition signal at the particular time instant.

DESCRIPTION OF THE PREFERRED EMBODIMENT

Figure 1:
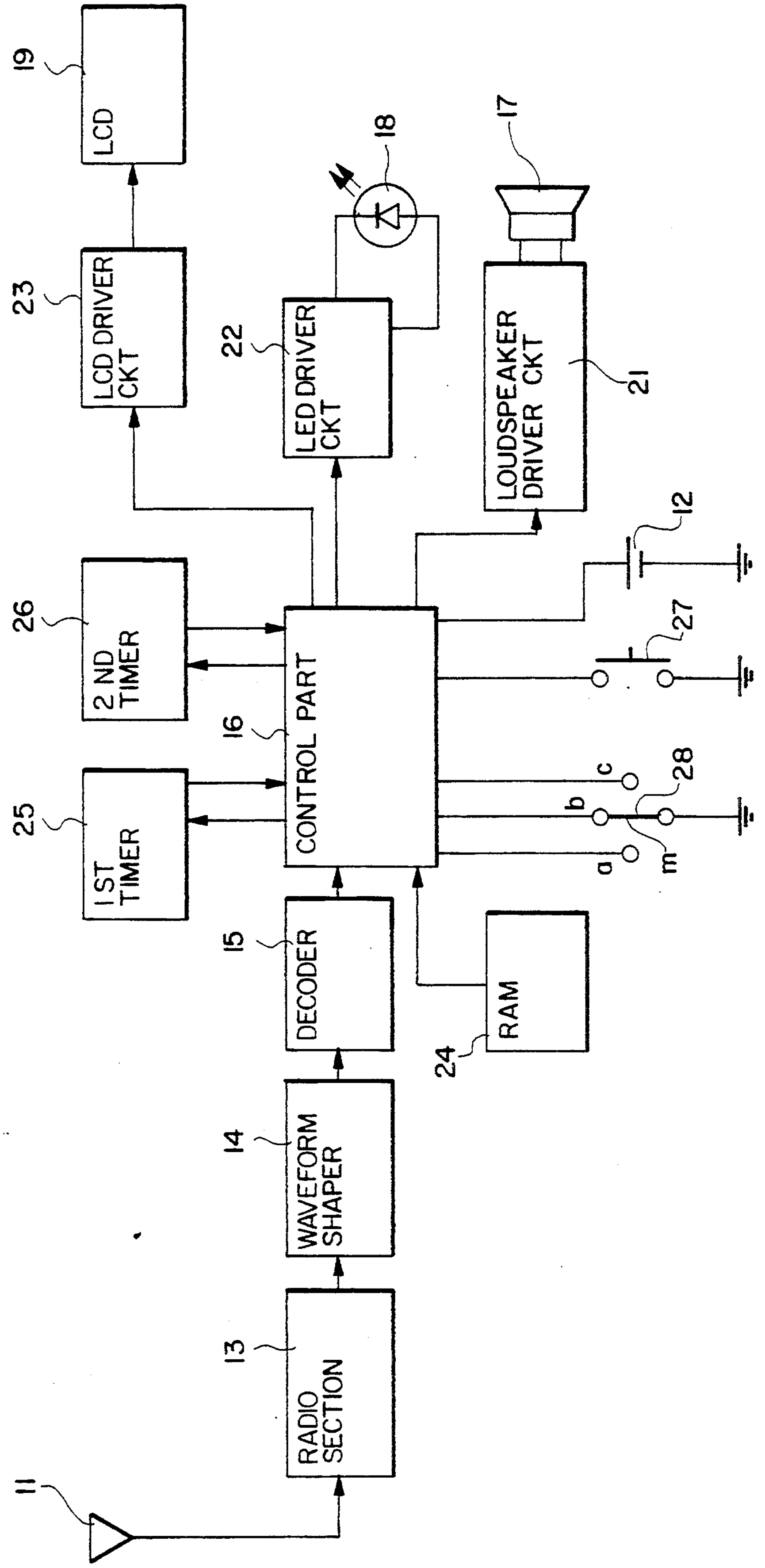
FIG. 1 is a block diagram of a radio paging receiver according to a first embodiment of this invention.

Referring to FIG. 1, a paging device according to a first embodiment of this invention is for selectively receiving a plurality of call signals which are specific to the receiver. Each of the call signals comprises a call number signal and a message signal following the call signal and is transmitted as a radio signal from a transmitting station (not shown). The message signal is for carrying a message. The call number signal represents a call number assigned to the paging receiver to which the message should be directed.

The paging receiver comprises an antenna 11 for receiving the radio signal and is connected to a battery 12, which is for supplying electric power to the paging receiver. The radio signal is picked up by the antenna 11 and supplied to a radio section 13. When activated by the electric power supplied from the battery 12, the radio section 13 converts or demodulates the radio signal into a baseband or demodulated signal. The demodulated signal is supplied to a waveform shaper 14.

The waveform shaper 14 is activated by the electric power to shape a waveform of the demodulated signal into a shaped signal of a digital waveform. The shaped signal is supplied to a decoder unit 15.

When activated by the electric power, the decoder unit 15 carries out judgement whether or not the call number is assigned to the paging receiver. When the call number is assigned to the receiver, the decoder unit 15 informs reception of the call signal to a control part 16 and sends the message to the control part 16. The control part 16 has an operation which will later by described in detail.

The paging receiver further comprises a loudspeaker 17, and LED (light emitting diode) 18, and an LCD (liquid crystal display) 19 which will be described below.

The loudspeaker 17 is connected to the decoder unit 15 through a loudspeaker driver circuit 21 of, for example, an amplifier activated by the electric power. The loudspeaker 17 serves, in cooperation with the loudspeaker driver circuit 12, as a tone generator for generating an audible tone with a controllable frequency.

The light emitting diode 18 is connected to the decoder unit 15 through an LED driver circuit 22 activated by the electric power. The light emitting diode 18 serves, in cooperation with the LED driver circuit 22, as a light generator for intermittently generating light.

The liquid crystal display 19 is connected to the decoder unit 15 through an LCD driver circuit 23 activated by the electric power. The liquid crystal display 19 serves, in cooperation with the LCD driver circuit 23, as a display unit for providing a visual display of the message.

A combination of the tone generator, the light generator, and the display unit is referred to as an announcing arrangement for carrying out announcement.

The announcing arrangement has a first, a second, and a third announcement mode. When the announcing arrangement is in the first announcement mode, each of the tone generator, the light generator and the display unit is driven. In this event, the tone generator generates the audible tone having a predetermined frequency. When the announcing arrangement is in the second announcement mode, each of the light generator and the display unit is driven. The tone generator is not driven. When the announcing arrangement is in the third announcement mode, each of the tone generator, the light generator and the display unit is driven as is similar to a case where announcing arrangement is in the first announcement mode. In this event, the tone generator generates the audible tone having another frequency which is different from the predetermined frequency.

The paging receiver further comprises a RAM (random access memory) 24, a fist timer 25, and a second timer 26 which are connected to the control part 16. The random access memory 24 is for memorizing the message. The first timer 25 is for determining a first predetermined time duration, which may be three seconds long, for example. The second timer 26 is for determining a second predetermined time duration, which may be fifteen minutes long, for example.

The paging receiver further comprises a manually operable reset switch 27 and a mode selection switch 28, both of which are connected to the control part 16. The reset switch 27 has on and off states. When closed to the on state by a possessor of the radio paging receiver, the reset switch 27 produces an announcement stop instruction signal which serves to make the announcing arrangement stop the announcement.

The mode selection switch 28 is switchable to a plurality of positions for selecting a first, a second, and a third receiver mode, one at a time. In particular, the mode selection switch 28 comprises first, second, and third fixed contact points a, b, and c and a movable contact member m which is selectively connected to a selected one of the first, the second, and the third fixed contact points a, b, and c.

When the movable contact member m is connected to the first fixed contact point a by the possessor of the radio paging receiver, the paging receiver is in the first receiver mode in which the control part 16 puts the announcing arrangement into the first announcement mode. When the movable contact member m is connected to the second fixed contact point b, the paging receiver is in the second receiver mode in which the control part 16 puts the announcing arrangement into the second announcement mode. When the movable contact member m is connected to the third fixed contact point c, the paging receiver is in the third receiver mode in which the control part 16 disconnects the battery 12 from the paging receiver.

Figure 2:
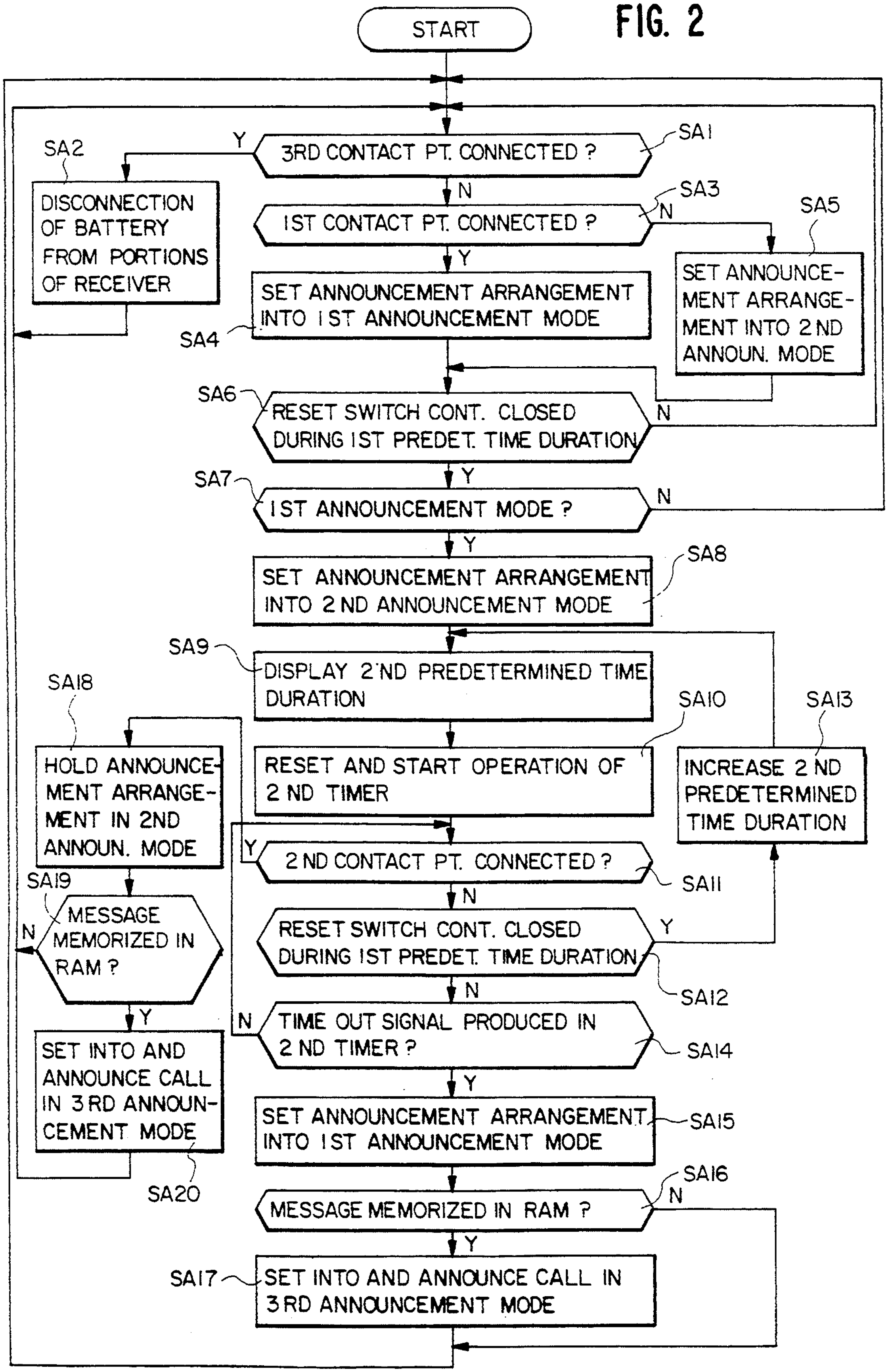
FIG. 2 is a flow chart for use in describing operation of the radio paging receiver illustrated in FIG. 1.

Referring to FIG. 2 together with FIG. 1, operation of the control part 16 will be described in detail. A start stage proceeds to a first state SA1 at which the control part 16 inspects the mode selection switch 28 to produce a condition signal. In other words, judgement is carried out in the control part 16 whether or not the movable contact member m is connected to the third fixed contact point c. This function of the control part 16 is referred to as an inspecting arrangement.

When the movable contact member m is connected to the third fixed contact point c, the first stage SA1 is followed by a second stage SA2. At the second stage SA2, the control part 16 disconnects the battery 12 from the paging receiver. As a result, the paging receiver is put into the third receiver mode. The second stage SA2 returns to the first stage SA1. Accordingly, as long as the movable contact member m is connected to the third fixed contact point c, no power will be supplied to the paging receiver. Of course, power is still supplied to the control part 16.

When the movable contact member m is not connected to the third fixed contact point c, the first stage SA1 proceeds to a third stage SA3 at which the control part 16 carries out judgement whether or not the movable contact member m is connected to the first fixed contact point a. When the movable contact member m is connected to the first fixed contact point a, the third stage SA3 is followed by a fourth stage SA4 at which the paging receiver is found to be in the first receiver mode. Therefore, the control part 16 puts the announcing arrangement into the first announcement mode.

When the movable contact member m is not connected to the first fixed contact point a, the third stage SA3 proceeds to a fifth stage SA5 at which the paging receiver is found in the second receiver mode. Each of the fourth and the fifth stages SA4 and SA5 is followed by a sixth stage SA6.

At the sixth stage SA6, the control part 16 carries out judgement whether or not the reset switch 27 is closed continuously during the entire first predetermined time duration that is determined by the first timer 25. When the reset switch 23 is opened before lapse of the first predetermined time duration, operation returns to the first stage SA1. Herein, the reset switch 23 will be referred to as a manually operable producing arrangement for producing a determining signal.

When the reset switch 27 is closed continuously during the first predetermined time duration, the sixth stage SA6 proceeds to a seventh stage SA7 at which the control part 16 carries out judgment whether or not the announcing arrangement is in the first announcement mode, the seventh stage SA7 is followed by an eight stage SA8 which will be described in the following. Otherwise, the seventh stage SA7 returns to the first stage SA1. Accordingly, if the pager is in the second announcement mode, which is a silent mode, no mode change will occur in response to the closure of the reset switch.

At the eighth stage SA8, the control part 16 puts the announcing arrangement into the second announcement mode. When the call signal is received while the announcing arrangement is put in the second announcement mode, the message is memorized in the random access memory 24. This function of the control part 16 will be referred to as a second selecting arrangement.

The eighth stage SA8 is succeeded by a ninth stage SA9 at which the control part 16 makes the liquid crystal display 19 provide a predetermined numeral "15" as the visual display thereon. The predetermined numeral represents the second predetermined time duration. The ninth stage SA9 is succeeded by a tenth stage SA10 at which the control part 16 resets the second timer 26 and starts operation of the second timer 26. The second timer 26 produces a time out signal when the second predetermined time duration lapses after the second timer 26 is started. Therefore, the second timer 26 will be referred to herein as an internal determining arrangement. A combination of the internal determining and the manually operable producing arrangements is referred to as an instant determining arrangement for determining a particular, or first, time instant at a specific, or second, time instant which is previous to the particular time instant.

The tenth stage SA10 is succeeded by an eleventh stage SA11. At the eleventh stage SA11, the control part 16 carries out judgement whether or not the movable contact member m is connected to the second fixed contact point b. When the movable contact member m is not connected to the second fixed contact point b, the eleventh stage SA11 is followed by a twelfth stage SA12.

At the twelfth stage SA12, the control part 16 carries out judgement whether or not the reset switch 27 is closed continuously during the entire first predetermined time duration that is determined by the first timer 25. When the reset switch 27 is closed continuously during the first predetermined time duration, the twelfth stage SA12 is followed by a thirteenth stage SA13 at which the control part 16 makes the second timer 26 increase the second predetermined time duration. Such an increasing of the second predetermined time duration may be fifteen minutes long, for example. The thirteenth stage SA13 returns to the eighth stage SA8.

When the reset switch 23 is not continuously closed during the first predetermined time duration, the twelfth stage SA12 is followed by a fourteenth stage SA14 at which the control part 16 carries out judgement whether or not the time out signal is produced by the second timer 26. When the time out signal is produced, the fourteenth stage SA14 is followed by a fifteenth stage SA15 which will be described in the following. Otherwise, the fourteenth stage SA14 returns to the eleventh stage SA11.

At the fifteenth stage SA15, the control part 16 puts the announcing arrangement into the first announcement mode. This function of the control part 16 will be referred to as a first selecting arrangement. A combination of the first and the second selecting arrangements will be referred to as an announcement mode selecting arrangement. The fifteenth stage SA15 proceeds to a sixteenth stage SA16.

At the sixteenth stage SA16, the control part 16 carries out judgement whether or not a message is memorized in the random access memory 24. When the message is memorized in the random access memory 24, the sixteenth stage SA16 proceeds to a seventeenth stage SA17 which will be described in the following. Otherwise, the sixteenth stage SA16 returns to the first stage SA1.

At the seventeenth stage SA17, the control part 16 puts the announcing arrangement into the third announcement mode and makes the announcing arrangement announce the announcement in relation to the message that is memorized in the random access memory 24. The seventeenth stage SA17 returns to the first stage SA1.

Attention will be directed to a case where the movable contact member m is connected to the second fixed contact point b at the eleventh stage SA11. In such a case, the eleventh stage SA11 proceeds to an eighteenth stage, wherein the announcement arrangement is held in the second announcement mode, and then to a nineteenth stage SA19.

AT the nineteenth stage SA19, the control part 16 carries out judgement whether or not the message is being memorized in the random access memory 24. When the message is memorized in the random access memory 24, the nineteenth stage SA19 proceeds to a twentieth stage SA20 which will be described in the following. Otherwise, the nineteenth stage SA19 returns to the first stage SA1.

At the twentieth stage SA20, the control part 16 puts the announcing arrangement into the third announcement mode and makes the announcing arrangement announce the announcement in relation to the message that is memorized in the random access memory 24. The twentieth stage SA20 returns to the first stage SA1.

When the fourteenth stage SA14 is carried out, the control part 16 produces a determining signal and will therefore be referred to herein as a producing arrangement. Responsive to the determining signal, the first selecting arrangement selects the first announcement mode at the fifteenth stage SA15.

In the example described in conjunction with FIGS. 1 and 2, the announcing arrangement is controlled at the particular instant to have the first announcement mode even if the pager receiver is put in the second receiver mode at the current time. Therefore, it is insured that the announcing arrangement is not put in the second announcement mode for a long time interval.

Figure 3:
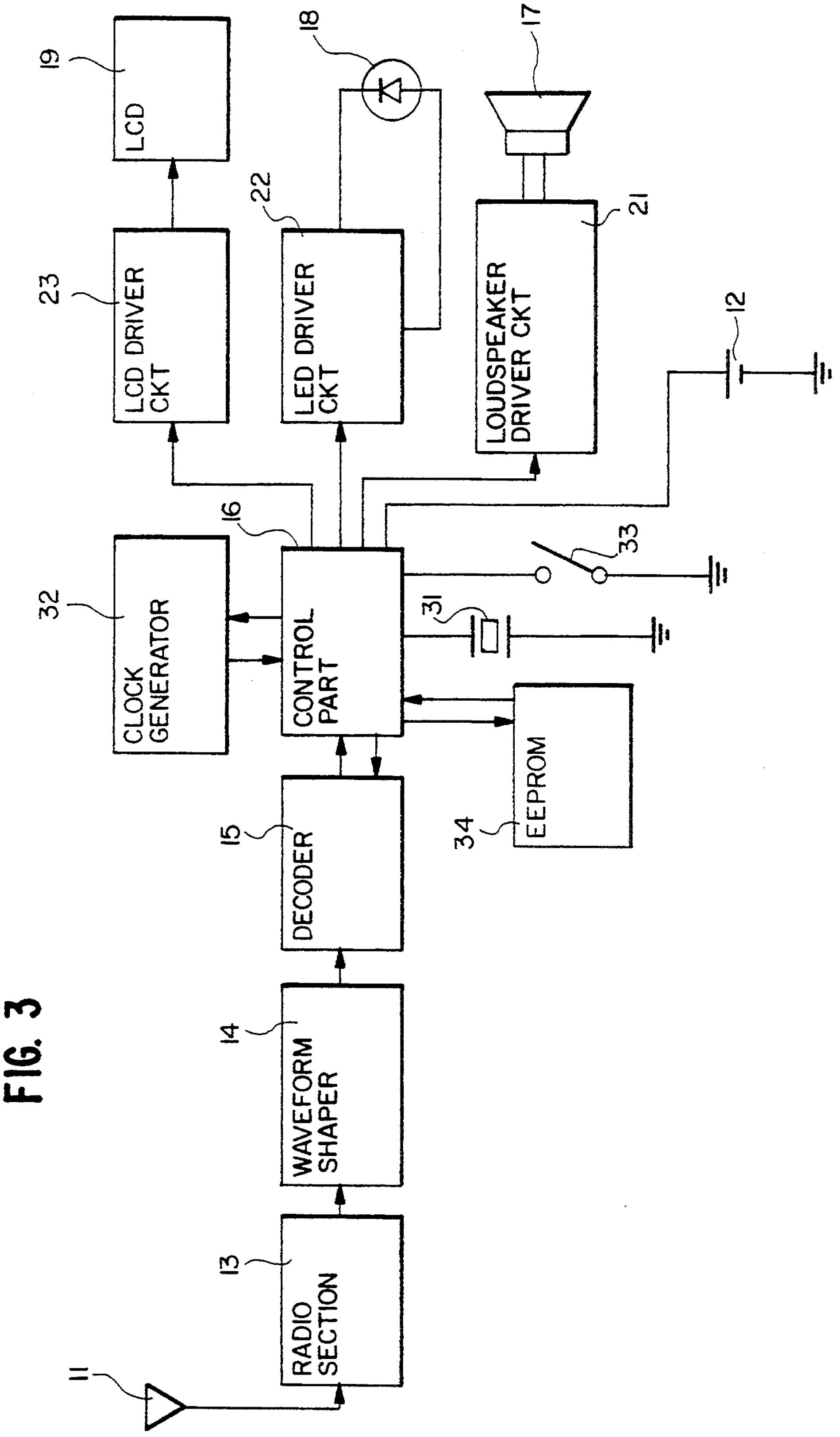
FIG. 3 is a block diagram of a radio paging receiver according to a second embodiment of this invention.

Referring to FIG. 3, the description will proceed to a paging receiver according to a second embodiment of this invention. The paging receiver comprises a quartz crystal oscillator 31, a clock generator 32, and a power switch 33 which will be described below.

The quartz crystal oscillator 31 is connected to the control part 16 and generates a clock signal which is supplied to the control part 16. In addition, the clock signal is supplied to the clock generator 32 through the control part 16.

The clock generator 32 is connected to the control part 16 and produces a current time signal representative of a current time instant. Generally, the control part 16 sends the current time signal to the LCD driver circuit 23 to make the liquid crystal display 19 provide the current time instant as the visual display. The clock generator 32 will be referred to as a generating arrangement.

The power switch 33 is connected to the control part 16 and has on and off states. When the power switch 33 is in the on state, the paging receiver can receive the radio signal. When the power switch 33 is in the off state, the radio signal is not received by the paging receiver.

The paging receiver further comprises an EEPROM (electrical erasable programmable read only memory) 34 for memorizing an identification number which is specific to the illustrated paging receiver. In the manner known in the art, the decoder unit 15 compares the call number with the identification number that is read out from the electrical erasable programmable read only memory 34. When the call number is coincident with the identification number, the control part 16 controls each of the loudspeaker, the LED, and the LCD driver circuits 21, 22, and 23.

In addition, the electrical erasable programmable read only memory 34 can memorize the particular time instant at the specific time instant. The particular time instant may be determined by the possessor. The electrical erasable programmable read only memory 34 is referred to as the instant determining arrangement.

The control part 16 carries out judgement with reference to the current time signal whether or not the current time instant is the same as the particular time instant. When the current time becomes the particular time instant, the control part 16 produces a particular time signal. Responsive to the particular time signal, the control part 16 controls the announcing arrangement as will later be described in detail.

Figure 4:
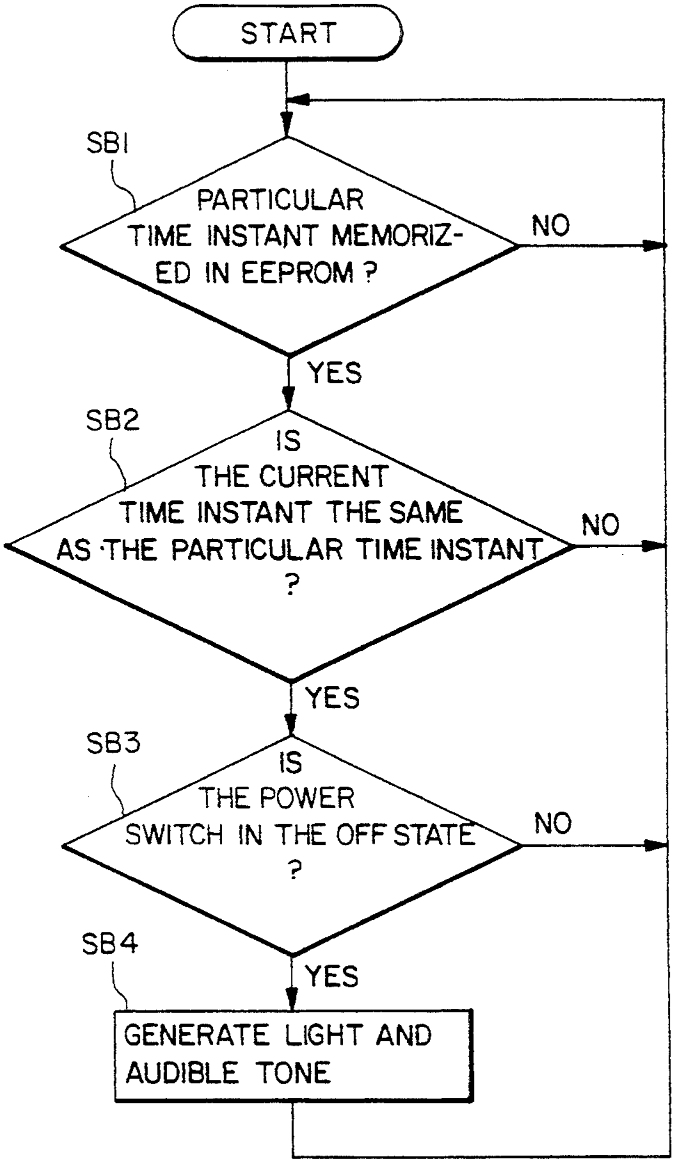
FIG. 4 is a flow chart for use in describing operation of the radio paging receiver illustrated in FIG. 3.

Referring to FIG. 4 together with FIG. 3, operation of the control part 16 will be described in detail. A start stage proceeds to a first stage SB1 at which the control part 16 carries out judgement whether or not the particular time instant is memorized in the electrical erasable programmable read only memory 34. When the particular time instant is memorized in the electrical erasable programmable read only memory 34, the first stage SB1 proceeds to a second stage SB2 which will be described below. Otherwise, the first stage SB1 is repeatedly carried out.

At the second stage SB2, the control part 16 carries out judgement whether or not the current time instant is the same as the particular time instant. When the current time instant is the same as the particular time instant, the second stage SB2 proceeds to a third stage SB3 which will be described in the following. Otherwise, the second stage SB2 returns to the first stage SB1. When the second stage SB2 is carried out, the function of the control part 16 will be referred to as a judging arrangement.

At the third stage SB3, the control part 16 carries out judgement whether or not the power switch 33 is in the off state. Namely, the control part 16 inspects the power switch 33 to produce a switch-off signal as the condition signal. Therefore, this function of the control part 16 is referred to herein as the inspecting arrangement. When the power switch 33 is in the off state, the third stage SB3 proceeds to the fourth stage SB4 which will be described below. Otherwise, the third stage SB2 returns to the first stage SB1.

At the fourth stage SB4, the control part 16 makes the announcing arrangement generate an alert as the announcement in compliance with the switch-off-signal at the particular time instant. Namely, the loudspeaker 17 generates the audible tone. Simultaneously, the light emitting diode 18 intermittently generates light. The fourth stage SB4 returns to the first stage SB1.

In the example being illustrated in FIGS. 3 and 4, the announcing arrangement generates the audible tone and the intermittently generated light at the particular time instant when a power switch 33 is in the off state. Therefore, the possessor is advised with that the power switch 33 is in the off state.

While the present invention has thus far been described in connection with embodiments thereof, it will readily be possible for those skilled in the art to put this invention into practice in various other manners. For example, another time instant may be determined in the electrical erasable programmable read only memory 34 in addition to the particular time instant.

I claim:

1. A paging receiver comprising:

announcing means for carrying out announcement in relation to information which is directed to said paging receiver, said announcing means having a plurality of announcement modes for said announcement;

selecting means connected to said announcing means for selecting a predetermined one of said announcement modes to make said announcing means carry out said announcement in said predetermined one of said announcement modes;

determining means for determining a predetermined time duration;

manually operable producing means for producing a determining signal in response to a manual operation of said manually operable producing means; and setting means connected to said announcing means, said determining means, and said manually operable producing means for setting said announcing means in another one of said announcement modes only during said predetermined time duration after production of said determining signal, said announcing means being returned to said predetermined one of said announcement modes after a lapse of said predetermined time duration.

2. A paging receiver as claimed in claim 1, further comprising:

memory means connected to said announcing means and said setting means for memorizing said information while said announcing means is put in said other one of said announcement modes;

additional producing means connected to said determining means and said manually operable producing means for producing a time out signal when said predetermined time duration lapses after the production of said determining signal; and directing means connected to said announcing means, said memory means, and said additional producing means and responsive to said time out signal for directing, in a case where said memory means memorizes said information, said announcing means to carry out said announcement in one of said announcement modes which is difference from said other one of said announcement modes.

3. A paging receiver responsive to a radio call signal with a call number for carrying out announcement in relation to information which is directed to said paging receiver in a plurality of announcement modes when said call number is assigned to said paging receiver, said paging receiver comprising:

a switch;

first announcing means for carrying out said announcement in a first announcement mode;

second announcing means connected to said switch for carrying out said announcement in a second announcement mode only during a predetermined time duration after operation of said switch;

third announcing means connected to said second announcing means for carrying out, only when said paging receiver receives with said radio call signal in said second announcement mode, said announcement in a third announcement mode after said predetermined time duration lapses; and enabling means connected to said first and said third announcing means for enabling said first announcing means to carry out said announcement after each of said second and said third announcing means carries out said announcement.

* * * * *

UNITED STATES PATENT AND TRADEMARK OFFICE

CERTIFICATE OF CORRECTION

PATENT NO. : 5,434,563
DATED : July 18, 1995
INVENTOR(S) : Kazuhiro Kudoh

It is certified that error appears in the above-indentified patent and that said Letters Patent is hereby corrected as shown below:

Column 3, line 31 delete "fist", insert --first--

Column 4, line 20 after "part 16", insert --of the paging device--

Column 4, line 35 after "mode." insert --Therefore, the control part 16 puts the announcing arrangement into the second announcing mode.--

Column 6, lines 6-9 delete "an eighteenth stage, wherein the announcement arrangement is held in the second announcement mode, and then to a nineteenth stage", insert --a nineteenth stage--

Column 6, line 39 after "invention.", insert --The paging receiver comprises similar parts designated by like reference numerals.--

Signed and Sealed this

Twenty-sixth Day of March, 1996

Attest:

BRUCE LEHMAN

*Attesting Officer* *Commissioner of Patents and Trademarks*